No. 677,404. Patented July 2, 1901.
G. F. DUNN.
FOLDING MACHINE.
(Application filed Oct. 24, 1900.)
(No Model.) 6 Sheets—Sheet 3.
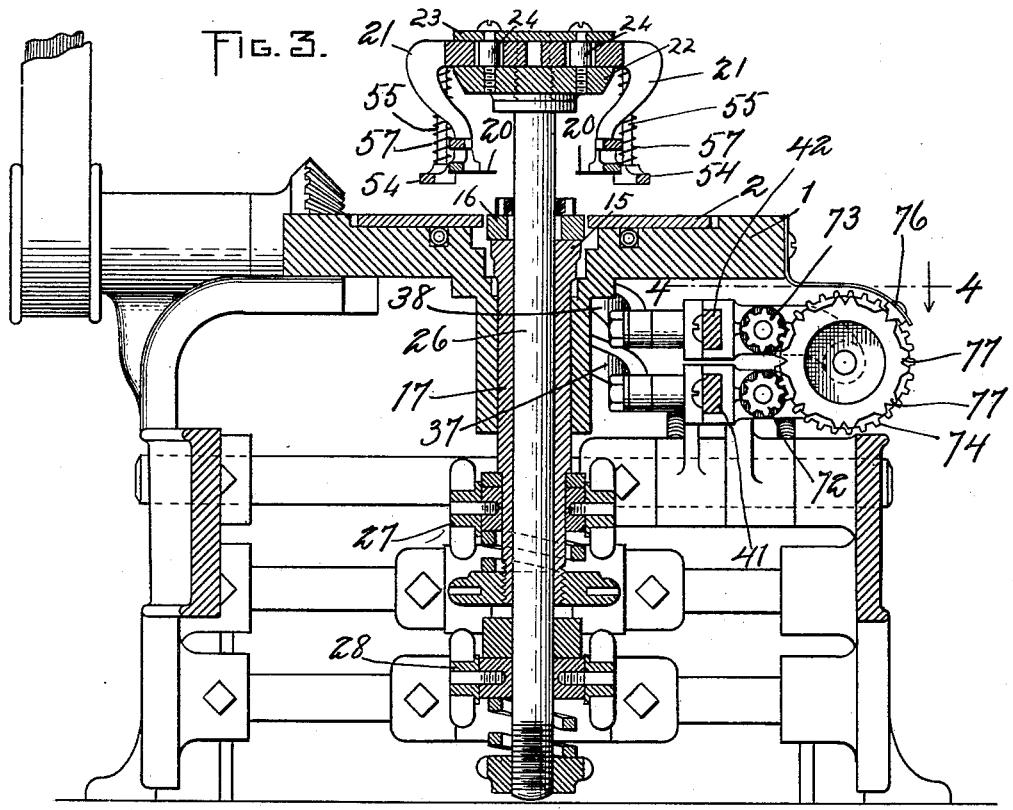
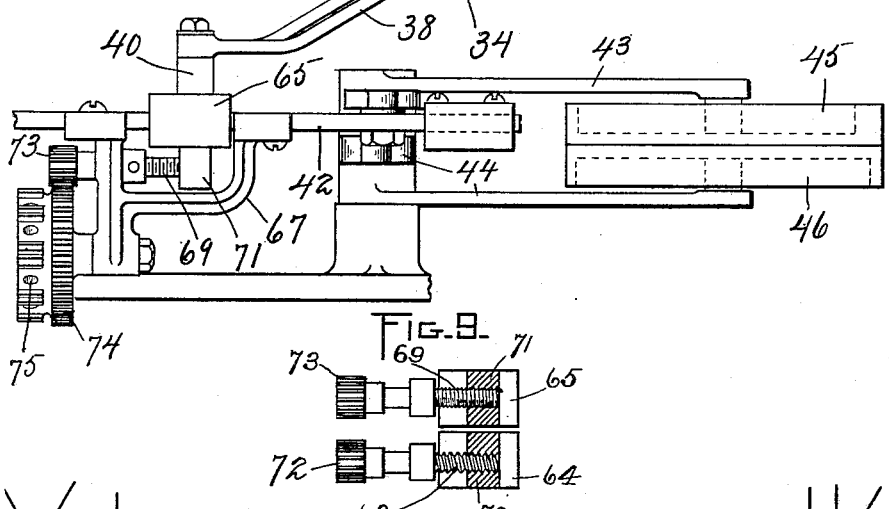
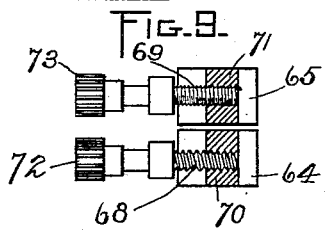
WITNESSES: INVENTOR:

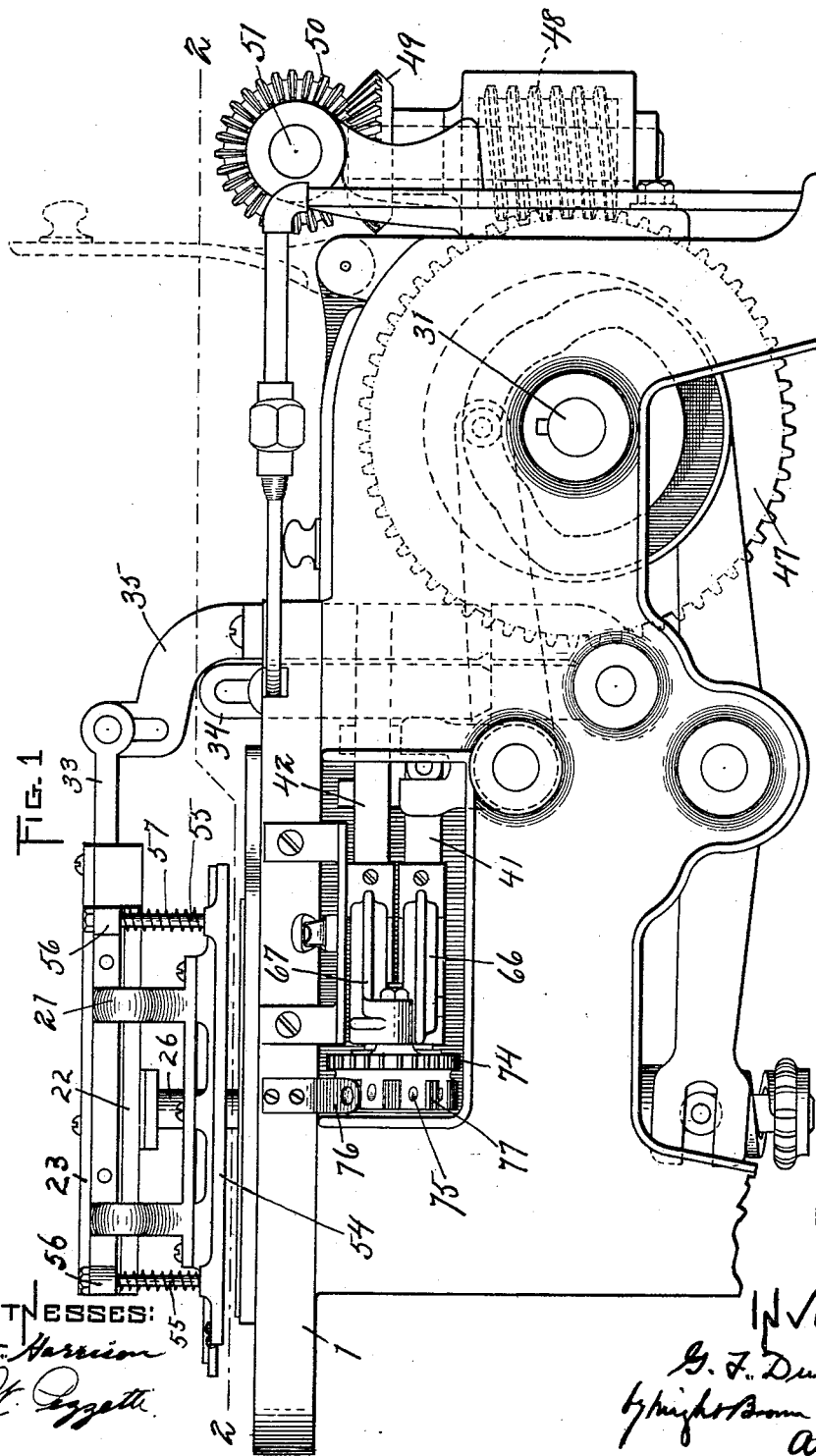

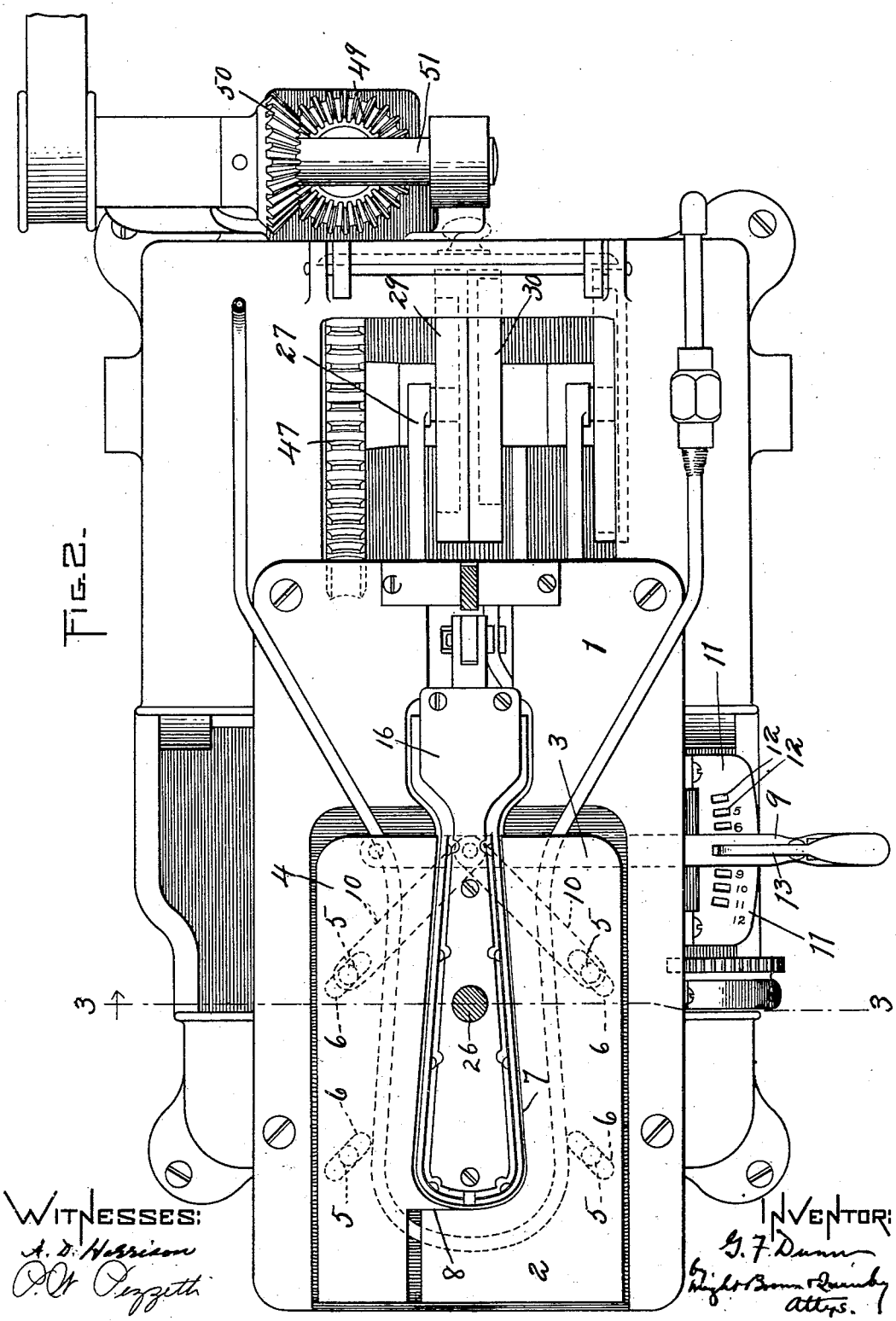

No. 677,404. Patented July 2, 1901.
G. F. DUNN.
FOLDING MACHINE.
(Application filed Oct. 24, 1900.)
(No Model.) 6 Sheets—Sheet 4.
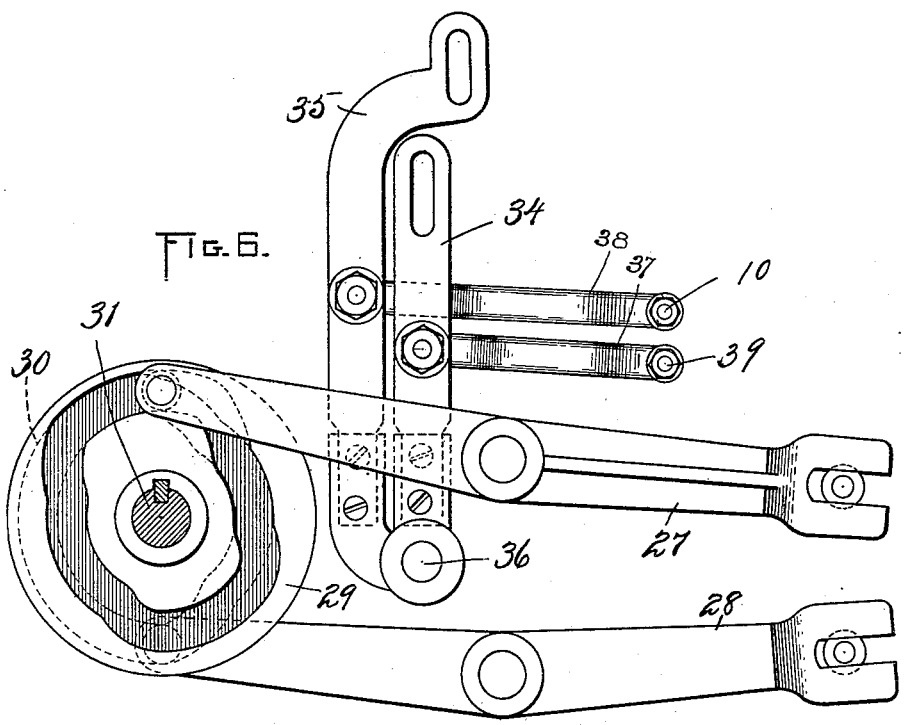
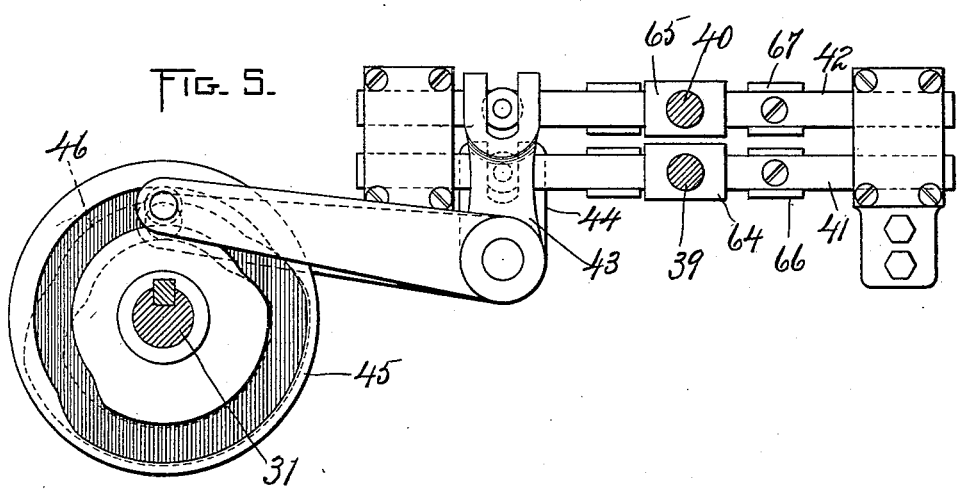
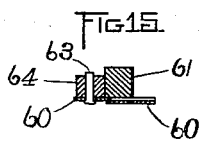

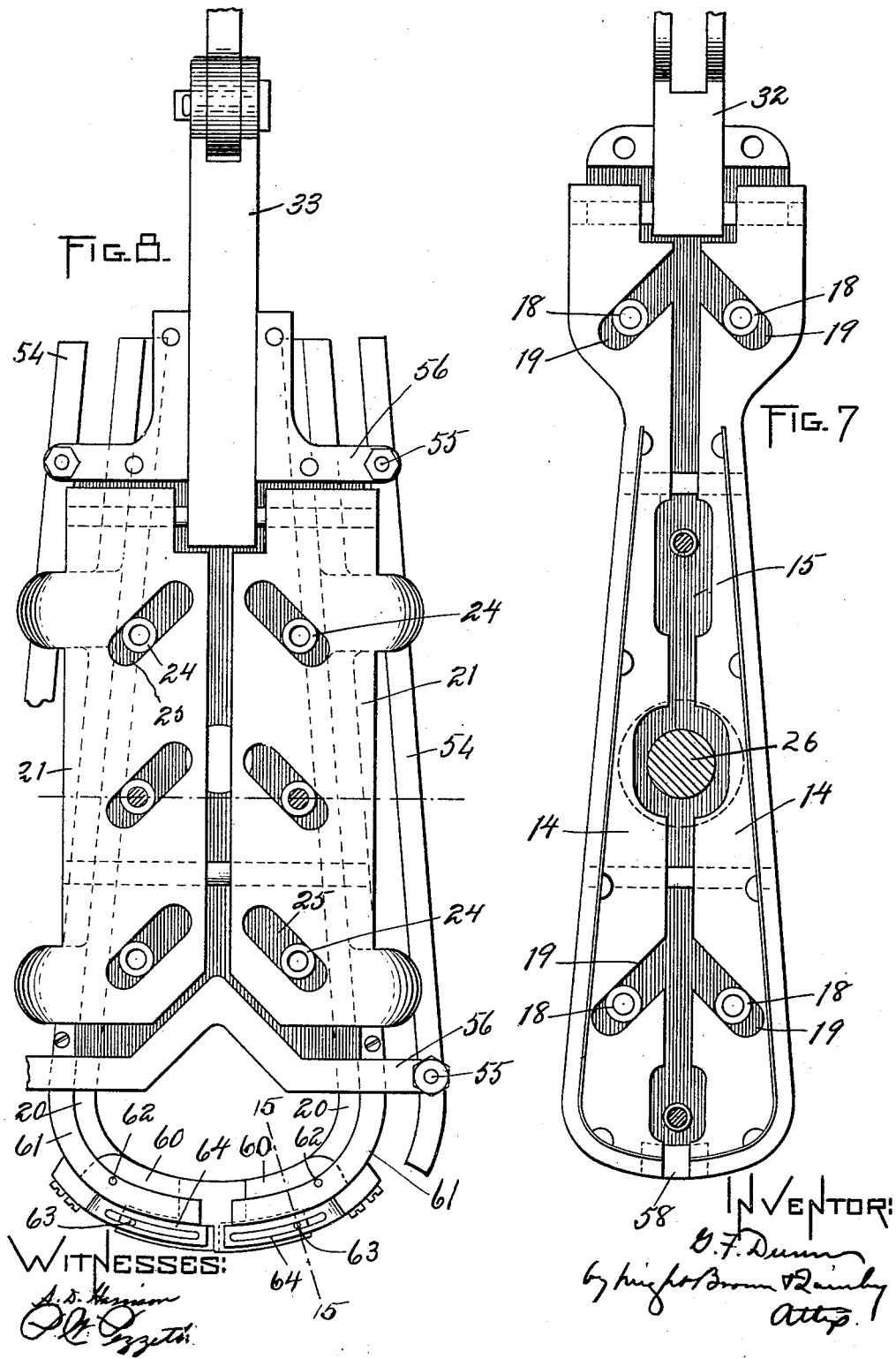

No. 677,404. Patented July 2, 1901.
G. F. DUNN.
FOLDING MACHINE.
(Application filed Oct. 24, 1900.)
(No Model.) 6 Sheets—Sheet 6.
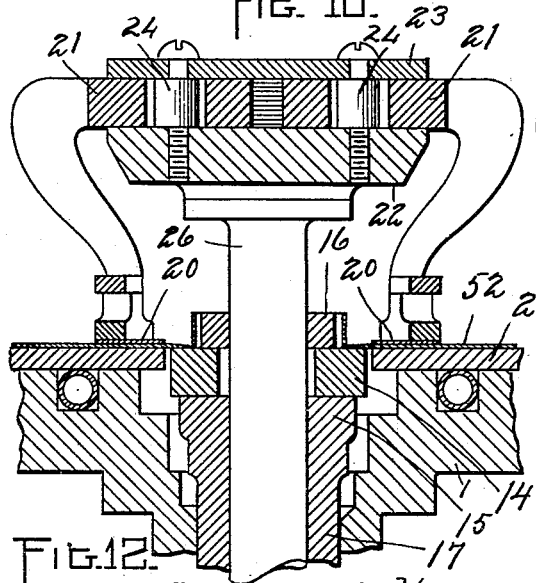
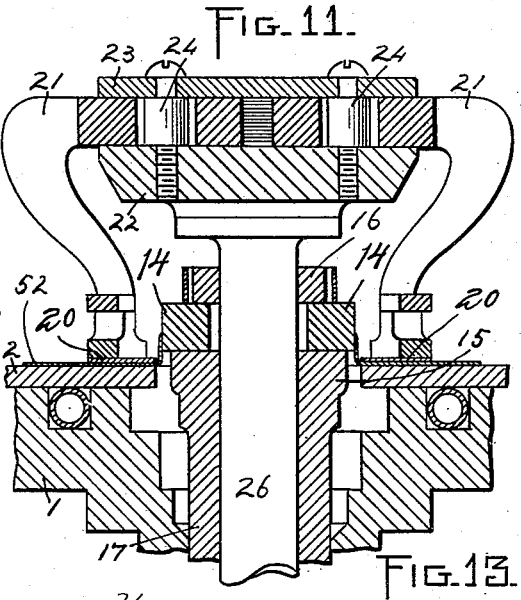
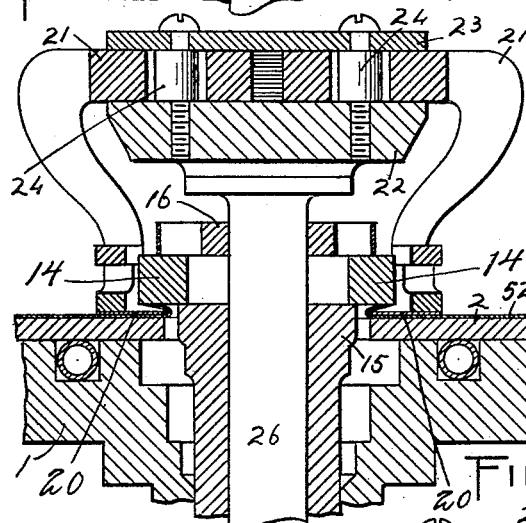
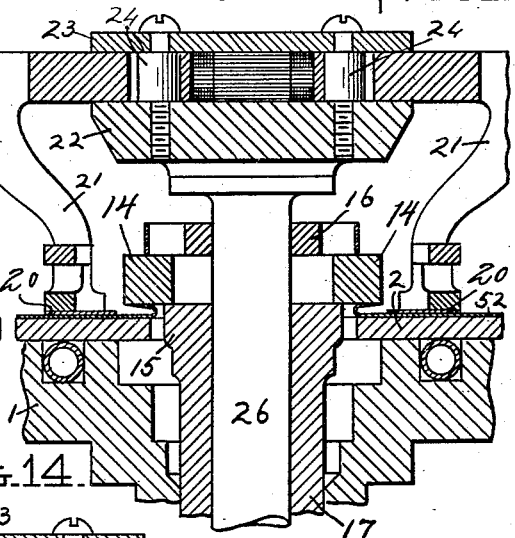
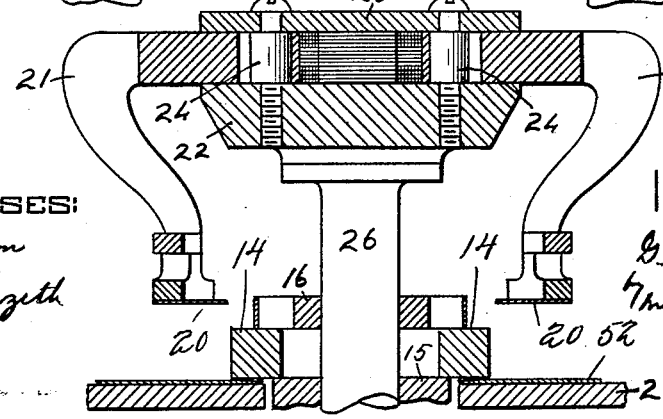

United States Patent Office.

GEORGE F. DUNN, OF BROCKTON, MASSACHUSETTS, ASSIGNOR OF ONE-HALF TO THE BROCKTON SUPPLY COMPANY, OF SAME PLACE.

FOLDING-MACHINE.

SPECIFICATION forming part of Letters Patent No. 677,404, dated July 2, 1901.

Application filed October 24, 1900. Serial No. 34,171. (No model.)

*To all whom it may concern:*

Be it known that I, GEORGE F. DUNN, of Brockton, in the county of Plymouth and State of Massachusetts, have invented certain new and useful Improvements in Folding-Machines, of which the following is a specification.

This invention relates to machines for folding vamps of boots and shoes or articles having a similar edge conformation.

The invention is an improvement on prior machines of this nature; and its principal object is to make a better fold than heretofore at the front or inner end of the U-shaped recess in the vamp.

Other objects of the invention are to provide an improved adjustment or regulation of the machine for work of different sizes and to provide means for clamping the work to the work-supporting table.

The invention consists in the novel features of construction and arrangement which I shall now proceed to describe and claim.

Of the accompanying drawings, Figure 1 represents a side elevation of a vamp-folding machine constructed in accordance with my invention. Fig. 2 represents a plan view of the parts of the machine below the line 2 2 of Fig. 1. Fig. 3 represents a transverse vertical section on the line 3 3 of Fig. 2. Fig. 4 represents a plan view of the parts below the line 4 4 of Fig. 3. Figs. 5 and 6 represent detail elevations of the operating mechanism. Figs. 7 and 8 represent plan views, enlarged, of the folder and former. Fig. 9 represents a detail sectional view of a part of the adjustment for the former and folder. Figs. 10 to 14, inclusive, represent sectional views showing the manner of making the fold. Fig. 15 represents a section on the line 15 15 of Fig. 8.

In the drawings, 1 is the bed of the machine, and 2 is a work-supporting table mounted in a recess therein and which I make in two parts or halves 3 4, having downwardly-projecting pins 5 5, guided in slots 6 6 in the bed, the slots on the two sides being divergent and each located at an angle of about forty-five degrees to the middle line of the table. The table 2 has a recess whose inner edge 7 is substantially U-shaped, like the inner edge of a vamp. Each of the two halves or plates 3 4 has approximately one-half of the U-shaped working edge 7, and at the middle of the bend or forward part of the U the plates are lapped on a line 8 at right angles to the middle line of the table. Longitudinal movement is imparted to the plates by means of a lever 9, pivoted to the under side of the table and connected by two links 10 10 with the respective plates. The effect of this longitudinal movement is to spread the plates apart or draw them together, and thus expand or contract the recess, increasing or decreasing the length of its working edge. The working edge of the table should be approximately of the same shape and extent as the inner edge of the vamp. Hence when vamps of different sizes are to be folded the plates 3 4 are adjusted by moving the lever 9. Below the outer end of said lever is a stationary plate 11, having a segmental series of notches 12 12, adapted to be entered by the nose of a latch 13, mounted on the lever. The notches form a series of stops for determining different positions of the plate and are preferably numbered according to the different sizes of vamps.

14 14 represent a folder mounted between two plates 15 16 at the upper end of a vertically-movable sleeve 17. The plates 15 16 constitute a holder or carrier for the folder, said holder having guide-studs 18, occupying diagonal slots 19, formed in the two plates or halves 14, which constitute the folder. These slots are divergently located at angles of about forty-five degrees with the middle longitudinal line of the folder, and when longitudinal movement is imparted to the plates, causing them to slide between the plates 15 16, the folder is expanded or contracted.

20 20 are two blades, forming the sides of a former and secured to a two-part frame 21 21, the upper portion of which is mounted to slide between two plates 22 23, constituting a carrier or holder for said frame. The carrier is provided with guide-studs 24, occupying divergent slots 25 in the parts of the frame, and when longitudinal movement is imparted to said frame parts the former is caused to expand and contract. The plates 22 23 are mounted at the upper end of a stem 26, which slides vertically in the sleeve 17.

Vertical movements are imparted to the sleeve 17 and stem 26, respectively, by pivoted levers 27 28, engaged with said sleeve and stem and oscillated by grooved cams 29 30 upon a shaft 31.

The plates 14 14 of the folder and the parts 21 21 of the former-carrying frame are connected by links 32 33 with the upper ends of two levers 34 35, pivoted at their lower ends upon a stud or shaft 36. Said levers are connected by links 37 38 with two studs 39 40, mounted upon horizontal sliding rods 41 42. These rods are reciprocated by bell-crank levers 43 44, oscillated by grooved cams 45 46 on the shaft 31. The shaft 31 carries a worm-gear 47 in mesh with a worm 48, which is rotated by bevel-gearing 49 50 from a belt-shaft 51. Suitable arrangements, which I have not herein illustrated, are made whereby a treadle or lever is depressed and the shaft 31 makes one complete revolution and stops. During this revolution the former and folder perform the movements illustrated in Figs. 10 to 14, inclusive, to make the fold. The vamp 52 being placed upon the work-supporting table 2 when the former 20 is elevated and the folder 14 depressed on a level with the top of the table, the inner edge of the vamp overlapping the folder, the former is caused to descend upon the work, as illustrated in Fig. 10. The folder then rises, as illustrated in Fig. 11, and is expanded to project over the former, as shown in Fig. 12, whereby the fold is made. The former is caused to expand to withdraw it from the fold, as shown in Fig. 13, and the folder finally descends upon and presses the fold, as shown in Fig. 14, the former rising to its original position.

54 54 represent two bars having stems 55 55, mounted in suitable guides 56 on the former-carrier and surrounded by springs 57 57, which exert yielding downward pressure on the bars 54. Said bars constitute clamps, which normally project below the former and serve to descend upon the work to hold it to the table, particularly when the former is being withdrawn, as shown in Fig. 13.

The continuity of the folder is preserved at the bend or curve in its U-shaped edge by providing thin overlapping plates 58 on the respective halves, as indicated in Fig. 7, so that when the folder is expanded it has a continuous operating portion. Heretofore a similar expedient has been resorted to to preserve the continuity of the former. Since the former, however, determines the shape of the folded edge on the vamp, it is important to have it do its work as accurately as possible. The halves of the former in expanding and contracting move at an angle of forty-five degrees, so that each half has an equal amount of lateral and longitudinal movement. The lateral expansion or contraction of the whole former, therefore, is double its longitudinal expansion or contraction. When different sizes of vamps are to be operated upon by machines of this character, it is necessary to change the operating positions of the former and folder, these positions being the ones assumed at the beginning of the folding operation, as illustrated in Fig. 10. When an adjustment is made for a different size of vamp, the change in the width of the former will be double the change in its length, as above explained. This does not exactly correspond with the proper change in the vamp, for the increase or decrease in length of the recess in the vamp should be more than half its increase in width. In the drawings I have shown a device for securing this additional increase. 60 60 represent two leaves or sections of the former, located in recesses between the rib or portion 61 of the former-supporting frame, to which the side portions 20 of the former are attached, and pivoted upon pintles 62 62. These sections overlap, so as to preserve the continuity of the former when expanded, and the free end of each section is provided with a stud or pin 63, engaged with a slotted guide 64, attached to the opposite half of the former-supporting frame. These guides converge forwardly, so that when the former is expanded and the studs 63 are thrown toward the inner ends of the guides the inner or meeting ends of the sections 60 will move in a forward direction relatively to the side sections 20 of the former.

In the operation of folding the work the expanding and contracting movement of the former is greater than that of the folder. This is accomplished, as shown in the drawings, by making the lever 34, which operates the folder, shorter than the lever 35, which operates the former, and imparting a substantially equal movement to each lever. When adjustment is made for a different size of vamp, the former and folder are expanded or contracted, so as to assume a new initial folding position, and the amount of expansion or contraction required is equal for both. In order to make the adjustment equal in the former and folder, I impart unequal angular movements simultaneously to the levers 34 35. The studs 39 40, whereby the links 37 38, attached to said levers, are connected with the sliding rods 41 42, are mounted upon blocks 64 65, which are adapted to slide longitudinally of said bars. Rigidly affixed to said bars are two brackets 66 67, in which are journaled two screws 68 69, of unequal pitch, screwing through lugs 70 71 on the blocks 64 65. These screws have toothed pinions 72 73 on their ends, and the upper bracket 67 journals a gear-wheel 74, which meshes with said pinions. The hub of said wheel has a series of holes 75, Fig. 1, in which a tool may be inserted to turn the wheel, and a spring check-pawl 76, engaging teeth 77 77 on the hub of the wheel, holds said wheel in the position to which it is turned. Rotation of the wheel 74 simultaneously rotates the two screws 68 69, and their pitches are made such that the desired equal adjusting movements are thereby given to the former and the folder.

I claim—

1. In a vamp-folding machine, a substantially U-shaped former composed of halves which are mounted for movement diagonally toward and away from each other, and means to produce a longitudinal travel of the bend or end portion of the former during such movement, greater than the lateral movement of each half.

2. In a vamp-folding machine, a substantially U-shaped former made in halves which are mounted for movement toward and away from each other, each half comprising a plurality of relatively movable sections.

3. In a vamp-folding machine, a substantially U-shaped former made in halves which are mounted for movement diagonally toward and away from each other, each half comprising a plurality of relatively movable sections.

4. In a vamp-folding machine, a substantially U-shaped former made in halves which are mounted for movement toward and away from each other, each half comprising a side section and an end section relatively movable with respect to said side section, the end sections in the two halves overlapping.

5. In a vamp-folding machine, a substantially U-shaped former made in halves which are mounted for movement toward and away from each other, each half comprising a side section and an end section pivoted to said side section, the end sections in the two halves overlapping.

6. In a vamp-folding machine, a substantially U-shaped former made in halves which are mounted for movement diagonally toward and away from each other, each half comprising a side section and an end section pivoted to said side section, and a guiding connection between each side section and the end section of the opposite half.

7. In a vamp-folding machine, a substantially U-shaped former made in halves which are mounted for movement diagonally toward and away from each other, each half comprising a side section and an end section pivoted to said side section, and two diagonally-arranged guides connected with the respective side sections and converging forwardly, each guide being engaged with the end section of the opposite half.

8. In a vamp-folding machine, a substantially U-shaped former made in halves which are mounted for movement diagonally toward and away from each other, each half comprising a side section and an end section pivoted to said side section, two diagonally-arranged slotted guides connected with the respective side sections and converging forwardly, and a stud on each end section operating in the slot of the guide on the opposite half.

9. In a vamp-folding machine, a work-supporting table having a substantially U-shaped inner edge, and comprising a plurality of sections mounted for relative movement to expand and contract the opening inclosed by said edge.

10. In a vamp-folding machine, a work-supporting table having a substantially U-shaped inner edge, and comprising a plurality of sections lapped to preserve the continuity of said edge and mounted for relative movement to expand and contract the opening inclosed by said edge.

11. In a vamp-folding machine, a work-supporting table having a substantially U-shaped inner edge, and comprising two halves mounted for movement diagonally toward and away from each other to contract and expand the opening inclosed by said edge.

12. In a vamp-folding machine, a work-supporting table having a substantially U-shaped inner edge, and comprising two halves mounted for movement diagonally toward and away from each other to contract and expand the opening inclosed by said edge, and means to simultaneously so move said halves.

13. In a vamp-folding machine, a work-supporting table having a substantially U-shaped inner edge, and comprising two halves mounted for movement diagonally toward and away from each other to contract and expand the opening inclosed by said edge, operating mechanism adapted to simultaneously so move said halves, and a plurality of stops determining different positions of said mechanism and corresponding to different vamp sizes.

14. In a folding-machine, a former and a folder, mechanism for imparting substantially parallel movements of different extent respectively to said former and folder to fold the work, and mechanism for imparting simultaneously adjusting movements of substantially equal extent to said former and folder for different sizes of work.

15. In a folding-machine, a former and a folder, mechanism for imparting substantially parallel movements of different extent respectively to said former and folder to fold the work, mechanism including two screws of different pitch for adjusting the said former and folder respectively for different sizes of work, and means for simultaneously rotating said screws.

16. In a folding-machine, a former and a folder, mechanism for imparting substantially parallel movements of different extent respectively to said former and folder to fold the work, two levers of different length connected to said former and folder respectively, and movable to impart said folding movements, adjusting mechanism including two screws of different pitch for varying the positions of said levers for different sizes of work, and means for simultaneously rotating said screws.

17. In a vamp-folding machine, a former and a folder both substantially U-shaped and expansible and contractible, mechanism for imparting expanding and contracting movements of different extent respectively to said former and folder in the operation of folding the work, and adjusting mechanism for imparting simultaneously expanding and contracting movements of substantially equal extent respectively to said former and folder for different sizes of vamps.

18. In a folding-machine, a work-supporting table, a former, a folder, and a clamp adapted to descend upon the work supported upon the table to hold the same from movement.

19. In a folding-machine, a work-supporting table, a former, a folder, a former-carrier, and a clamp yieldingly mounted upon said carrier and moved thereby to clamp the work upon the table or release the same.

In testimony whereof I have affixed my signature in presence of two witnesses.

GEORGE F. DUNN.

Witnesses:
C. F. BROWN,
A. D. HARRISON.